United States Patent
Zhao et al.

(10) Patent No.: US 10,212,168 B2
(45) Date of Patent: Feb. 19, 2019

(54) ELECTRONIC DEVICE AND CONTROL METHOD THEREOF

(71) Applicants: Beijing Lenovo Software Ltd., Beijing (CN); Lenovo (Beijing) Co., Ltd., Beijing (CN)

(72) Inventors: Zhiyang Zhao, Beijing (CN); Yang Zhang, Beijing (CN); Jinxuan Cui, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 288 days.

(21) Appl. No.: 14/979,123

(22) Filed: Dec. 22, 2015

(65) Prior Publication Data
US 2017/0063868 A1     Mar. 2, 2017

(30) Foreign Application Priority Data

Aug. 24, 2015  (CN) .......................... 2015 1 0523978
Oct. 26, 2015  (CN) .......................... 2015 1 0701256

(51) Int. Cl.
*H04W 12/08* (2009.01)
*G06F 15/16* (2006.01)
(Continued)

(52) U.S. Cl.
CPC .......... *H04L 63/102* (2013.01); *H04L 63/062* (2013.01); *H04L 63/0861* (2013.01);
(Continued)

(58) Field of Classification Search
CPC . H04L 63/102; H04L 63/062; H04L 63/0861; H04W 12/06; H04W 12/08; H04W 88/02
See application file for complete search history.

(56) References Cited

U.S. PATENT DOCUMENTS 8,321,945 B2 * 11/2012 Nakagawa ............ G06F 21/552
726/1
2004/0125994 A1 * 7/2004 Engels ............... G06K 9/00026
382/124
(Continued)

FOREIGN PATENT DOCUMENTS

CN      102891749 A      1/2013
CN      102902935 A      1/2013
(Continued)

OTHER PUBLICATIONS

First Chinese Office Action regarding Application No. 201510701256.X dated Sep. 14, 2017. English translation provided.
(Continued)

*Primary Examiner* — Khoi V Le
(74) *Attorney, Agent, or Firm* — Harness, Dickey & Pierce, P.L.C.

(57) ABSTRACT

An electronic device and a control method thereof are provided. The control method for the electronic device includes: acquiring a call instruction; calling a target application to acquire collection data; acquiring a security label, in a case that the target application operates in a first operating mode; storing the acquired collection data based on the security label, as a collection data with the security label, wherein the collection data with the security label is in an accessible state when a first access authority is met.

20 Claims, 7 Drawing Sheets

(51) Int. Cl.
*H04L 29/06* (2006.01)
*H04W 12/06* (2009.01)
*H04W 88/02* (2009.01)

(52) U.S. Cl.
CPC .......... *H04W 12/06* (2013.01); *H04W 12/08* (2013.01); *H04W 88/02* (2013.01)

(56) References Cited

U.S. PATENT DOCUMENTS

| | | | |
|---|---|---|---|
| 2008/0175443 A1* | 7/2008 | Kahn | G06F 21/32 382/115 |
| 2014/0337634 A1* | 11/2014 | Starner | H04L 9/3231 713/186 |
| 2015/0070301 A1* | 3/2015 | Chia | G06K 9/00087 345/174 |
| 2016/0063294 A1* | 3/2016 | Du | G06K 9/0002 382/124 |

FOREIGN PATENT DOCUMENTS

| | | |
|---|---|---|
| CN | 103699847 A | 4/2014 |
| CN | 104135605 A | 11/2014 |
| CN | 104253933 A | 12/2014 |
| JP | 2006148252 A | 6/2006 |

OTHER PUBLICATIONS

First Chinese Office Action regarding Application No. 201510523978.0 dated Sep. 25, 2017. English translation provided by Unitalen Attorneys at Law.

* cited by examiner

ELECTRONIC DEVICE AND CONTROL METHOD THEREOF

This application claims priority to Chinese Patent Application No. 201510523978.0, entitled "CONTROL METHOD AND ELECTRONIC DEVICE", filed with the Chinese State Intellectual Property Office on Aug. 24, 2015, and Chinese Patent Application No. 201510701256.X, entitled "CONTROL METHOD AND ELECTRONIC DEVICE", filed with the Chinese State Intellectual Property Office on Oct. 26, 2015, both of which are incorporated by reference in their entireties herein.

FIELD

The disclosure generally relates to the field of device control technology, and in particular to an electronic device and a control method for an electronic device.

BACKGROUND

With the development of technology, a wide variety of functions such as photograph, log, sound recording or the like can be implemented by applications in a terminal. Therefore, the security of data in the terminal has become increasingly demanded.

In the conventional art, a security password, such as a fingerprint password or a gesture password, is set for unlocking or booting the terminal, to protect the security of the data. A user can use the terminal and applications in the terminal only, in the case that a password input by the user matches with the security password.

In the above scheme, when the user forgets the security password, an input operation of the user can not unlock or boot the terminal. In this case, the user can not use the basic functions of the terminal, thereby causing inconvenience to the user and deteriorating user experience.

SUMMARY

An electronic device and control method thereof are provided according to the disclosure, for solving the technical problem in the conventional art that the input operation of the user can not unlock or boot the terminal in the case that the user forgets the security password, hence the user can not use the basic functions of the terminal, thereby deteriorating user experience.

In an aspect of the disclosure, a control method for an electronic device is provided. The control method includes:
acquiring a call instruction;
calling a target application in response to the call instruction, where the target application is configured to control a collector of the electronic device to acquire collection data;
acquiring a security label, in a case that the target application operates in a first operating mode;
storing the acquired collection data based on the security label, as a collection data with the security label,
where the collection data with the security label is in an accessible state when a first access authority is met.

Preferably, before the acquiring a security label, in a case that the target application operates in a first operating mode, the control method further includes:
acquiring an input operation in a running state of the target application; and
determining whether the target application is to run in the first operating mode or in a second operating mode based on the input operation.

Preferably, in a case that the target application runs in the second operating mode, the control method further includes:
storing the acquired collection data, as a collection data without the security label,
where the collection data without the security label is in the accessible state when a second access authority is met.

Preferably, the input operation may include: the target application controlling the collector of the electronic device to acquire the collection data, in the running state of the target application.

Preferably, the determining whether the target application is to run in a first operating mode or in a second operating mode based on the input operation may include:
determining whether the acquired input operation includes a fingerprint texture parameter;
determining that the target application is to run in the first operating mode, in a case that the acquired input operation includes the fingerprint texture parameter; and
determining that the target application is to run in the second operating mode, in a case that the acquired input operation does not include the fingerprint texture parameter,
where in the case that the target application runs in the first operating mode, the security label of the collection data acquired by the collector of the electronic device is the fingerprint texture parameter.

Preferably, the method may further include:
determining whether security parameter information of a user logging in to the electronic device conforms to the fingerprint texture parameter;
setting both the collection data with the fingerprint texture parameter and the collection data without the fingerprint texture parameter to the accessible state, in a case that the security parameter information of the user logging in to the electronic device conforms to the fingerprint texture parameter; and
setting the collection data with the fingerprint texture parameter to an inaccessible state for hiding the collection data, and setting the collection data without the fingerprint texture parameter to the accessible state, in a case that the security parameter information of the user logging in to the electronic device does not conform to the fingerprint texture parameter;
or
determining whether security parameter information of an operating body currently operating and browsing the target application conforms to the fingerprint texture parameter;
setting both the collection data with the fingerprint texture parameter and the collection data without the fingerprint texture parameter to the accessible state in a case that the security parameter information of the operating body currently operating and browsing the target application conforms to the fingerprint texture parameter; and
setting the collection data with the fingerprint texture parameter to an inaccessible state for hiding the collection data, and setting the collection data without the fingerprint texture parameter to the accessible state, in a case that the security parameter information of the operating body currently operating and browsing the target application does not conform to the fingerprint texture parameter.

Preferably, security parameter information may be generated from the input operation, and
the determining whether the target application is to run in a first operating mode or in a second operating mode based on the input operation may include:
determining whether the security parameter information generated from the input operation matches with a predefined security template;

determining that the target application is to run in the first operating mode, in a case that the security parameter information matches with the predefined security template; and determining that the target application is to run in the second operating mode, in a case that the security parameter information does not match with the predefined security template.

Preferably, the security label may be an identity feature match template, and in the case that the target application runs in the first operating mode, the control method may further include:

acquiring, by the electronic device, the identity feature match template;

acquiring, by the collector, the collection data; and storing, by the electronic device, the acquired collection data based on the identity feature match template.

Preferably, the method may further include:

acquiring a user identity verification parameter when the collection data stored in the first operating mode is accessed; and opening an access authority for the collection data stored in the first operating mode, in a case that the user identity verification parameter matches with the identity feature match template.

Preferably, the acquiring, by the electronic device, an identity feature match template may include:

acquiring, by the electronic device, a target identity feature parameter using a biological feature collector; and setting the target identity feature parameter as the identity feature match template.

Optionally, the biological feature collector has a collection area provided on a surface of a first key of the electronic device, and the acquiring, by the electronic device, an identity feature match template may include:

recording the target identity feature parameter as the identity feature match template, where the target identity feature parameter is acquired at the collection area of the biological feature collector provided on the surface of the first key when the first key is triggered; and storing the acquired collection data based on the identity feature match template, in response to a storing instruction generated by triggering the first key.

Optionally, the collector has a collection key provided on the first key, and the acquiring, by the collector, the collection data may include: acquiring the collection data at a collection area of the collector when the first key is triggered.

In another aspect of the disclosure, an electronic device is provided, which includes:

an instruction acquiring unit configured to acquire a call instruction;

an application calling unit configured to call a target application in response to the call instruction, where the target application is configured to control a collector of the electronic device to acquire collection data;

a security label acquiring unit configured to acquire a security label, in a case that the target application operates in a first operating mode;

a collection data storing unit configured to storing the acquired collection data based on the security label, as a collection data with the security label, where the collection data with the security label is in an accessible state when a first access authority is met.

Preferably, the electronic device further includes:

an operation acquiring unit configured to acquire an input operation in a running state of the target application; and a mode determining unit configured to determine whether the target application is to run in the first operating mode or in a second operating mode based on the input operation.

Preferably, the collection data storing unit further configured to store the acquired collection data, as a collection data without the security label, where the collection data without the security label is in the accessible state when a second access authority is met.

Preferably, the input operation may include: the target application controlling the collector of the electronic device to acquire the collection data in the case that the target application is in the running state.

Preferably, the mode determining unit may include:

a fingerprint determining subunit configured to: determine whether the acquired input operation includes a fingerprint texture parameter; trigger a first determining subunit in a case that the acquired input operation includes the fingerprint texture parameter; and trigger a second determining subunit in a case that the acquired input operation does not include the fingerprint texture parameter;

the first determining subunit configured to determine that the target application is to run in the first operating mode; and the second determining subunit configured to determine that the target application is to run in the second operating mode, where in the case that the target application runs in the first operating mode, the security label of the collection data acquired by the collector of the electronic device is the fingerprint texture parameter.

Preferably, the electronic device may further include:

a first state setting unit configured to: determine whether security parameter information of a user logging in to the electronic device conforms to the fingerprint texture parameter; set both the collection data with the fingerprint texture parameter and the collection data without the fingerprint texture parameter to the accessible state in a case that the security parameter information of the user logging in to the electronic device conforms to the fingerprint texture parameter; and set the collection data with the fingerprint texture parameter to an inaccessible state for hiding the collection data and set the collection data without the fingerprint texture parameter to the accessible state in a case that the security parameter information of the user logging in to the electronic device does not conform to the fingerprint texture parameter;

or a second state setting unit configured to: determine whether security parameter information of an operating body currently operating and browsing the target application conforms to the fingerprint texture parameter; set both the collection data with the fingerprint texture parameter and the collection data without the fingerprint texture parameter to the accessible state in a case that the security parameter information of the operating body currently operating and browsing the target application conforms to the fingerprint texture parameter; and set the collection data with the fingerprint texture parameter to an inaccessible state for hiding the collection data and set the collection data without the fingerprint texture parameter to the accessible state in a case that the security parameter information of the operating body currently operating and browsing the target application does not conform to the fingerprint texture parameter.

Preferably, security parameter information may be generated from the input operation, and the mode determining unit may include:

a match determining subunit configured to: determine whether the security parameter information generated from the input operation matches with a predefined security template; trigger a third determining subunit in a case that the security parameter information matches with the predefined security template; and trigger a fourth determining subunit in a case that the security parameter information does not match with the predefined security template;

the third determining subunit configured to determine that the target application is to run in the first operating mode; and the fourth determining subunit configured to determine that the target application is to run in the second operating mode.

Optionally, the security label may be an identity feature match template, and the electronic device may further include:

a processing unit configured to, in the case that the target application runs in the first operating mode, acquire the identity feature match template; trigger the collector to acquire the collection data; and store the acquired collection data based on the identity feature match template.

Optionally, the electronic device may further include:

a parameter acquiring unit configured to acquire a user identity verification parameter when the collection data stored in the first operating mode is accessed; and a control unit configured to open an access authority for the collection data stored in the first operating mode, in a case that the user identity verification parameter matches with the identity feature match template.

Optionally, the processing unit may be further configured to: acquire a target identity feature parameter by a biological feature collector of the electronic device; and set the target identity feature parameter as the identity feature match template.

Optionally, the biological feature collector has a collection area provided on a surface of a first key of the electronic device, and the processing unit may be further configured to: record the target identity feature parameter as the identity feature match template, where the target identity feature parameter is acquired at the collection area of the biological feature collector provided on the surface of the first key when the first key is triggered; and store the acquired collection data based on the identity feature match template, in response to a storing instruction generated by triggering the first key.

Optionally, the collector has a collection key provided on the first key, and the processing unit may be further configured to acquire the collection data at a collection area of the collector when the first key is triggered.

Therefore, in the electronic device and the control method thereof according to the disclosure, the operating mode of the target application in the electronic device is determined based on the input operation of the user which is acquired in a process of the target application in the running state. In a case that the target application runs in the first operating mode, the collection data acquired by the collector of the electronic device has the security label. In a case that the target application runs in the second operating mode, the collection data acquired by the collector of the electronic device does not have the security label. The collection data is in the accessible state in a case that a corresponding access authority is met. In this way, it is whether the security of the collection data acquired by the collector is protected based on the input operation, thereby avoiding the case that the user can not use the terminal because the user forgets the security password. Therefore, according to the disclosure, the user can call the application in the terminal to acquire the collection data in a case that the input operation does not include the security label, and the security of the collection data may be protected in a case that the input operation includes the security label, thereby bringing the user more usage effect and improving the user experience.

BRIEF DESCRIPTION OF THE DRAWINGS

Technical solutions of the embodiments of the present disclosure and/or the conventional art will be illustrated more clearly with the following brief description of the drawings. Apparently, the drawings referred in the following description constitute only some embodiments of the disclosure. Those skilled in the art may obtain some other drawings from the provided drawings without any creative work.

DETAILED DESCRIPTION OF EMBODIMENTS

The technical solution according to the embodiments of the disclosure is described clearly and completely as follows in conjunction with the accompanying drawings. Apparently, the described embodiments are only a part of the embodiments according to the disclosure. Any of other embodiments obtained by those skilled in the art based on the embodiments in the disclosure without any creative work falls in the scope of the disclosure.

Figure 1:
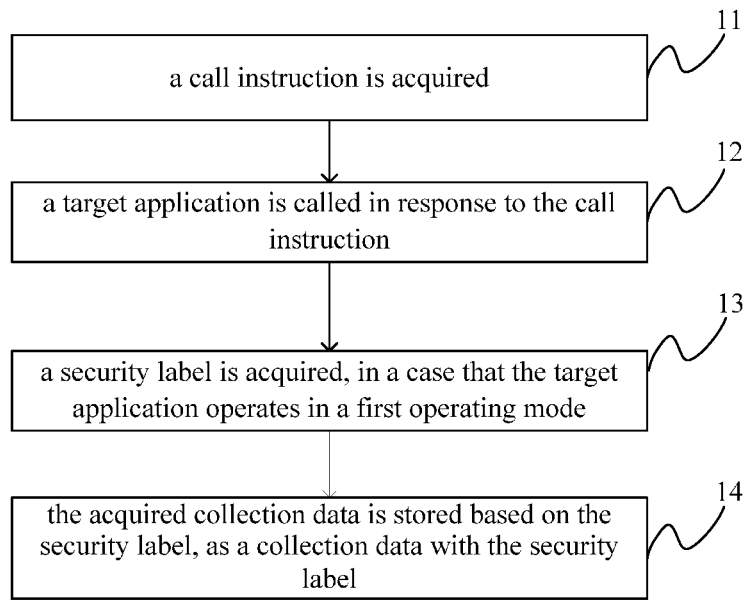
FIG. 1 is a flow chart of a control method for an electronic device according to an embodiment of the disclosure.

Referring to FIG. 1, a flow chart of a control method for an electronic device is provided according to an embodiment of the disclosure. The electronic device is a terminal device such as a mobile phone, a pad, a notebook, and an all-in-one machine. The electronic device includes a collector for acquiring data, such as a touch screen, a camera or a microphone.

In the embodiment, the control method may include steps 11 to step 14.

In step 11, a call instruction is acquired.

In step 12, the target application is called in response to the call instruction. The target application is configured to control a collector of the electronic device to acquire collection data.

In step 13, a security label is acquired, in a case that the target application operates in a first operating mode.

In step 14, the acquired collection data is stored based on the security label, as a collection data with the security label.

The collection data with the security label is in an accessible state when a first access authority is met.

In this embodiment, the electronic device may operate only in the first operating mode. The first operating mode may be such as a safe mode.

With the control method for the electronic device according to the embodiment of the disclosure, the target application is called in response to the call instruction, to acquire collection data. The security label is acquired, in the case that the target application operates in a first operating mode. The acquired collection data is stored based on the security label, as a collection data with the security label. The collection data with the security label is in an accessible state when a first access authority is met. Thus, in the embodiment, the security label may be added for the collection data, so as to provide a safety protection for the collection data.

Figure 2:
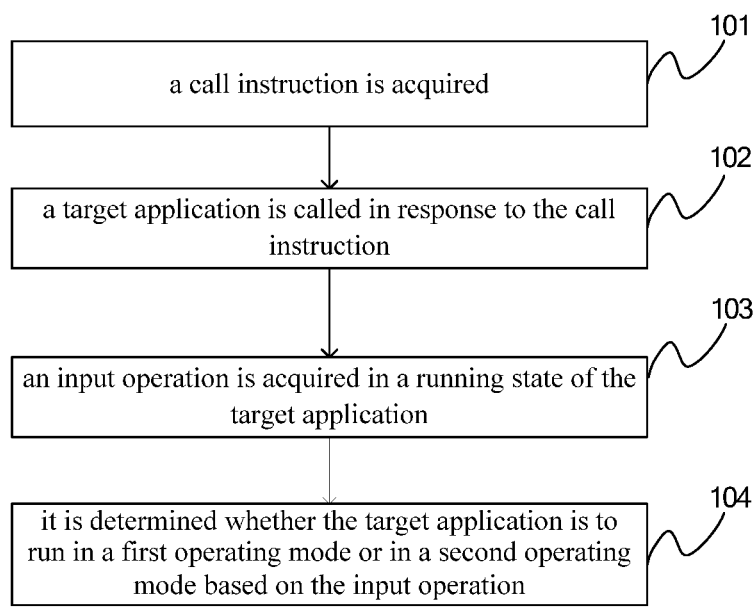
FIG. 2 is a flow chart of a control method for an electronic device according to another embodiment of the disclosure.

Referring to FIG. 2, a flow chart of a control method for an electronic device is provided according to another embodiment of the disclosure. The control method for an electronic device includes step 101 to step 104.

In step 101, a call instruction is acquired.

The call instruction may be an instruction that a user selects an icon of a target application on a display screen of the electronic device to cause the target application to enter a running state.

In step 102, the target application is called in response to the call instruction.

The target application is used to control a collector of the electronic device to acquire and store collection data. The collection data may be character data acquired by the touch screen, such as a log; multimedia data acquired by the camera, such as a photo or a video; or audio data acquired by the microphone, such as a sound recording. The target application may be an application capable of control the collector to acquire and store the collection data, such as a notebook application, a camera application, a voice recorder application. In the present embodiment, the target application corresponding to the call instruction is called after the call instruction is acquired, to control the collector of the electronic device to acquire and store the collection data.

In step 103, an input operation is acquired in a running state of the target application.

In a process from starting the target application to keeping the target application in the running state, the user performs the input operation on the electronic device. In the embodiment, the input operation is acquired at this time. The input operation can indicate that the user wants to protect the collection data currently acquired by the collector. For example, the user wants to perform privacy setting on the collection data acquired by the collector, or the user does not want to protect the security of the collection data so that the collection data may be accessed (such as, viewed or edited) by other users. In the present embodiment, the user performs the input operation on the electronic device depending on the requirement.

In step 104, it is determined whether the target application is to run in a first operating mode or in a second operating mode, based on the input operation.

In the present embodiment, security setting of the collection data to be set by the user may be determined by analyzing parameter information generated from the input operation. That is, it is determined whether the target application is to run in the first operating mode or in the second operating mode. Then, the target application is controlled to run in the first operating mode or in the second operating mode based on the determining result.

Specifically, in a case that the target application runs in the first operating mode, the collection data acquired by the collector of the electronic device has a security label. The collection data with the security label is in an accessible state in a case that a first access authority is met. The first access authority is a specific access authority, such as an access authority of the user or an operating body meeting a certain requirement. In the case of an access authority other than the first access authority, the collection data with the security label is in an inaccessible state, in which for example the collection data is hidden, or the collection data can not be viewed or edited.

For example, the target application may be a camera application. In a case that the camera application runs in the first operating mode, photo or video data acquired by a camera under the control of the camera application has the security label. The data with the security label can be accessed, such as displayed or edited, only in a case that the first access authority is met. The data with the security label can not be accessed, such as displayed or edited, in the case that an access authority other than the first access authority is met.

In a case that the target application runs in the second operating mode, the collection data acquired by the collector of the electronic device does not have the security label. The collection data without the security label is in the accessible state in a case that a second access authority is met. The second access authority with respect to the first access authority may be understood as an access authority in which the collection data may be accessed by any users or any operation bodies.

For example, the target application may be a notebook application. In a case that the notebook application runs in the second operating mode, character data acquired by a touch screen under the control of the notebook application does not have the security label. The data without the security label can be accessed, such as displayed or edited, in a case that the second access authority is met.

With the control method for the electronic device according to the disclosure, the operating mode of the target application in the electronic device is determined based on the input operation of the user acquired in the running state of the target application. In the case that the target application runs in the first operating mode, the collection data acquired by the collector of the electronic device has the security label. In the case that the target application runs in the second operating mode, the collection data acquired by the collector of the electronic device does not have the security label. The collection data is in the accessible state in a case that a corresponding access authority is met. In this way, it is determined whether to protect the security of the collection data acquired by the collector based on the input operation, thereby avoiding the case that the user can not use the terminal when the user forgets the security password. Therefore, according to the present embodiment, the user can call the application in the terminal to acquire the collection data in a case that the input operation does not include the security label, and the security of the collection data may be protected in a case that the input operation includes the security label, thereby bringing the user more usage effect and improving the user experience.

It should be noted that, in the above embodiment, the input operation may include: the target application controlling the collector of the electronic device to acquire the collection data in a case that the target application is in the running state.

That is, the input operation is an operation performed on the electronic device by the user in the running state of the target application. The input operation is a triggering operation for triggering the target application to control the collector to acquire the collection data in the running state of the target application.

For example, the user calls a voice recorder application in the electronic device, and then the user performs an input operation on the electronic device in a process from starting the voice recorder application to keeping the voice recorder application in the running state. In the present embodiment, the input operation is acquired at this time. The input operation triggers the voice recorder application to control a microphone to record a voice in a case that the voice recorder application is in the running state.

Figure 3:
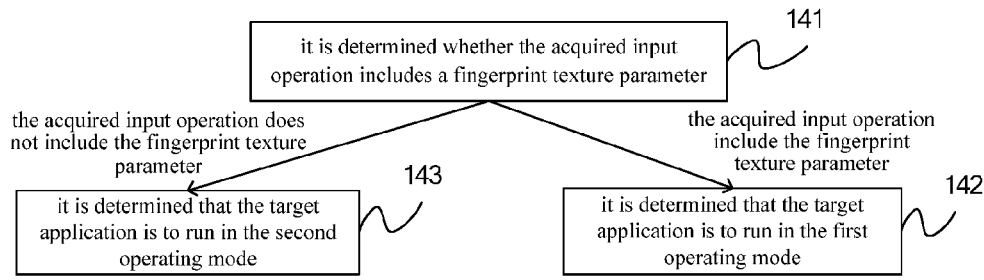
FIG. 3 is a partial flow chart of a control method for an electronic device according to another embodiment of the disclosure.

Referring to FIG. 3, a partial flow chart of a control method for an electronic device is shown according to another embodiment of the disclosure. FIG. 3 shows a flow chart of an implementation of step 104. Step 104 may include step 141 to step 143.

In step 141, it is determined whether the acquired input operation includes a fingerprint texture parameter. Step 142 is performed in the case that the acquired input operation includes the fingerprint texture parameter, and step 143 is performed in the case that the acquired input operation does not include the fingerprint texture parameter.

The fingerprint texture parameter may be fingerprint information inputted by the user in the input operation of the user, such as the fingerprint information of a finger performing a sliding operation.

In step 142, it is determined that the target application is to run in the first operating mode.

In the case that the target application runs in the first operating mode, the security label of the collection data acquired by the collector of the electronic device is the fingerprint texture parameter.

In step 143, it is determined that the target application is to run in the second operating mode.

In the present embodiment, in the running state of the target application, it is determined whether the input operation for triggering the target application to control the collector to acquire the collection data includes the fingerprint texture parameter, so as to determine whether the target application is to run in the first operating mode or in the second operating mode. Then, it is determined whether to set the security label to the collection data acquired by the collector.

Correspondingly, in a case that the target application runs in the first operating mode, the collection data acquired by the collector of the electronic device has the fingerprint texture parameter as the security label. The collection data with the fingerprint texture parameter as the security label is in the accessible state in a case that the first access authority is met. In a case that the target application runs in the second operating mode, the collection data acquired by the collector of the electronic device does not have the fingerprint texture parameter. The collection data without the fingerprint texture parameter is in the accessible state in a case that the second access authority is met.

Figure 4A:
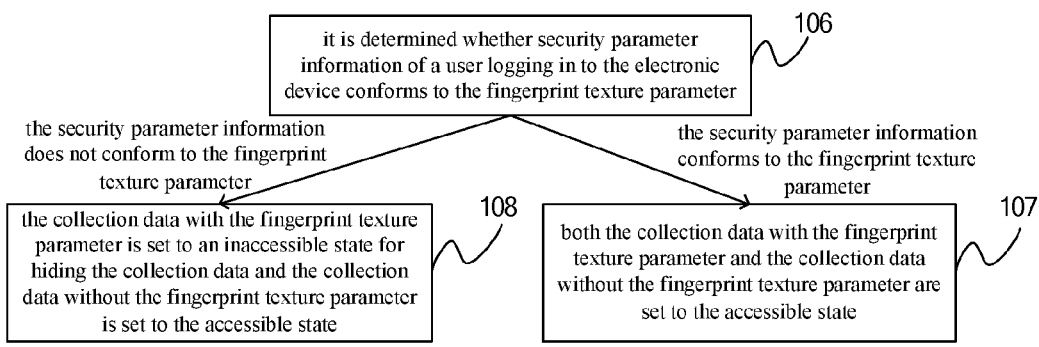
FIG. 4a is a partial flow chart of a control method for an electronic device according to another embodiment of the disclosure.

Based on the above embodiment, an access state of the collection data may be set based on the fingerprint texture parameter after the collection data is stored. Referring to FIG. 4a, a partial flow chart of a control method for an electronic device is shown according to another embodiment of the disclosure. After step 104, the control method may further include step 106 to step 108.

In step 106, it is determined whether security parameter information of a user logging in to the electronic device conforms to the fingerprint texture parameter. Step 107 is performed in a case that the security parameter information of the user logging in to the electronic device conforms to the fingerprint texture parameter, and step 108 is performed in a case that the security parameter information of the user logging in to the electronic device does not conform to the fingerprint texture parameter.

In step 107, both the collection data with the fingerprint texture parameter and the collection data without the fingerprint texture parameter are set to the accessible state.

In step 108, the collection data with the fingerprint texture parameter is set to an inaccessible state for hiding the collection data, and the collection data without the fingerprint texture parameter is set to the accessible state.

The security parameter information of the user logging in to the electronic device may be understood as information capable of indicating an identity of the user logging in to the electronic device. Thus, when the security parameter information conforms to the fingerprint texture parameter, it is indicated that the security of the identity of the user currently logging in to the electronic device conforms to a preset rule. For example, the user currently logging in to the electronic device is a valid user for the collection data corresponding to the fingerprint texture parameter. Thus, all of the collection data, such as both the collection data with the fingerprint texture parameter and the collection data without the fingerprint texture parameter, are set to the accessible state. The user currently logging in to the electronic device can access all of the collection data, that is, it is in the case of the first access authority.

When the security parameter information does not conform to the fingerprint texture parameter, it is indicated that the security of the identity of the user currently logging in to the electronic device does not conform to the preset rule. For example, the user currently logging in to the electronic device is an invalid user for the collection data corresponding to the fingerprint texture parameter. Not all of the collection data can be accessed by the invalid user. The invalid user can not access the collection data corresponding to the fingerprint texture parameter. In the present embodiment, only the collection data without the fingerprint texture parameter is set to the accessible state, the collection data with the fingerprint texture parameter is set to the inaccessible state for hiding the collection data. That is, in a case that the identity of the user currently logging in to the electronic device is not a safe identity, the collection data with the fingerprint texture parameter is hidden, which thus is in the inaccessible state and can not be viewed. In this way, the security of the collection data is protected.

The camera application is taken as an example. The input operation of the user is acquired in a process from beginning the camera application to keeping the camera application in the running state. It is determined whether the camera application is to run in the first operating mode such as a safe mode, or the camera application is to run in the second operating mode such as a common mode, by determining whether the acquired input operation includes the fingerprint texture parameter. The input operation triggers the camera application to control the collector such as the camera to acquire and store the photo data, after it is determined that the camera application is in the operating mode. Specifically, if the camera application runs in the safe mode, the photo data has the security label and the fingerprint texture parameter may be set as the security label; if the camera application runs in the common mode, the photo data does not have the security label. It is determined whether the security parameter information of the user logging in to the electronic device conforms to the fingerprint texture parameter when the collection data corresponding to the camera application is accessed such as viewed or edited by the user. Then, the access state of the photo data is set based on the determining result. Specifically, in the case that the security parameter information of the user logging in to the electronic device conforms to the fingerprint texture parameter, all of the photo data is set to the accessible state in which all of the photo data can be viewed or edited. In the case that the security parameter information does not conform to the fingerprint texture parameter, the photo data with the fingerprint texture parameter is set to the inaccessible state for hiding the photo data, and the photo data without the fingerprint texture parameter is set to the accessible state. In this way, the user, the security parameter information of whom conforming to the fingerprint texture parameter, can access only the photo data without the fingerprint texture parameter, and can not access the photo data with the fingerprint texture parameter.

Thus, in the technical solution according to the present embodiment, multiple users can use the same application in the same electronic device and protect the security of their own collection data such as photos.

Figure 4B:
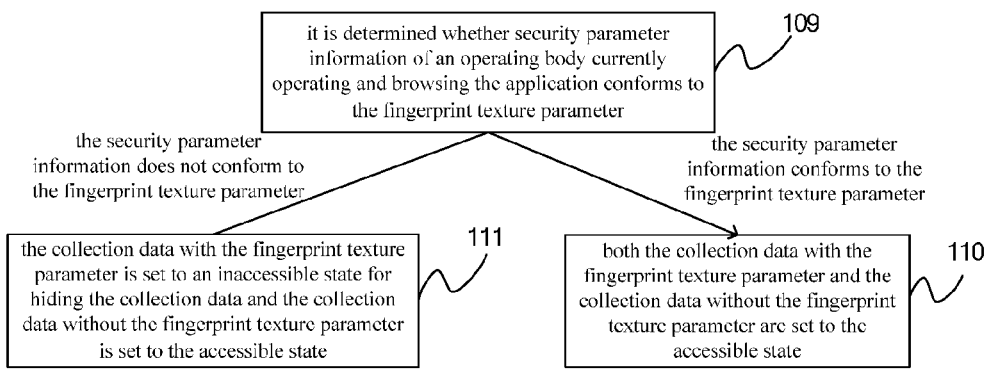
FIG. 4b is a partial flow chart of a control method for an electronic device according to another embodiment of the disclosure.

In another embodiment, referring to FIG. 4b, a partial flow chart of a control method for an electronic device is shown according to another embodiment of the disclosure. After step 104, the control method may further include step 109 to step 111.

In step 109, it is determined whether security parameter information of an operating body currently operating and browsing the application conforms to the fingerprint texture parameter. Step 110 is performed in a case that the security parameter information of the operating body currently operating and browsing the application conforms to the fingerprint texture parameter, and step 111 is performed in a case that the security parameter information of the operating body currently operating and browsing the application does not conform to the fingerprint texture parameter.

In step 110, both the collection data with the fingerprint texture parameter and the collection data without the fingerprint texture parameter are set to the accessible state.

In step 111, the collection data with the fingerprint texture parameter is set to the inaccessible state for hiding the collection data and the collection data without the fingerprint texture parameter is set to the accessible state.

The security parameter information of the operating body currently operating and browsing the application may be understood as information capable of indicating an identity of the user operating the operating body which currently operates and views the application. In a case that the security parameter information conforms to the fingerprint texture parameter, it is indicated that the security of the identity of the user operating the operating body, which currently operates and views the application, conforms to a preset rule. All of the collection data, such as the collection data with the fingerprint texture parameter and the collection data without the fingerprint texture parameter, are set to the accessible state. The user operating the operating body, which currently operates and views the application, can access all of the collection data, that is, it is in the case of the first access authority.

In a case that the security parameter information does not conform to the fingerprint texture parameter, it is indicated that the security of the identity of the user, who operates the operating body currently operating and browsing the application, does not conform to the preset rule. Not all of the collection data can be accessed by the user. In the present embodiment, only the collection data without the fingerprint texture parameter is set to the accessible state, and the collection data with the fingerprint texture parameter is set to the inaccessible state for hiding the collection data. That is, in a case that the identity of the user, who operates the operating body currently operating and browsing the application, is not a safe identity, the collection data with the fingerprint texture parameter is hidden to be in the inaccessible state, and can not be viewed. In this way, the security of the collection data is protected.

The log application or notebook application is taken as an example. The input operation performed by the user in a process from starting the log application to keeping the log application in the running state. It is determined whether the log application is to run in the first operating mode such as a safe mode, or the log application is to run in the second operating mode such as a common mode, by determining whether the acquired input operation includes the fingerprint texture parameter. The input operation triggers the log application to control the collector such as the touch screen to acquire and store the character data after the operating mode of the log application is determined. Specifically, in a case that the log application runs in the safe mode, the character data has the security label, and the fingerprint texture parameter may be set as the security label. In a case that the log application runs in the common mode, the character data does not have the security label. It is determined whether the security parameter information of the operating body currently operating and browsing the log application conforms to the fingerprint texture parameter, when the operating body operates and scans the log application to view or edit the log. Then, the access state of the character data, i.e. the log, is set based on the determining result. Specifically, in a case that the security parameter information of the operating body currently operating and browsing the application conforms to the fingerprint texture parameter, all of the character data is set to the accessible state in which the character data can be viewed or edited. In a case that the security parameter information does not conform to the fingerprint texture parameter, the character data with the fingerprint texture parameter is set to the inaccessible state for hiding the character data, and the character data without the fingerprint texture parameter is set to the accessible state. In this way, the user, who operates the security parameter information being not conforming to the fingerprint texture parameter, can access only the character data without the fingerprint texture parameter, and can not access the character data with the fingerprint texture parameter.

Thus, in the technical solution according to the present embodiment, multiple users can use the same application in the same electronic device and protect the security of their own collection data such as logs.

Figure 5:
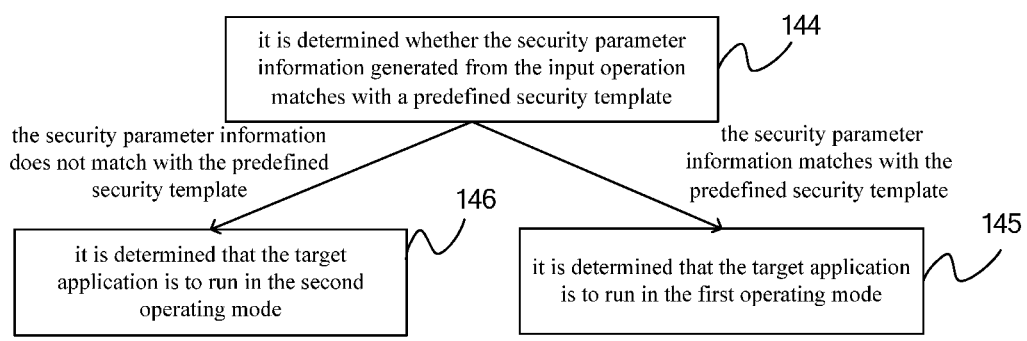
FIG. 5 is a partial flow chart of a control method for an electronic device according to another embodiment of the disclosure.

In other embodiments of the present disclosure, the security parameter information such as fingerprint information, graphic information or character information may be generated from the input operation. Referring to FIG. 5, a partial flow chart of a control method for an electronic device is shown according to another embodiment of the disclosure. FIG. 5 shows an implementation of step 104. Step 104 may include step 144 to step 146.

In step 144, it is determined whether the security parameter information generated from the input operation matches with a predefined security template. Step 145 is performed in a case that the security parameter information matches with the predefined security template, and step 146 is performed in a case that the security parameter information does not match with the predefined security template.

In step 145, it is determined that the target application is to run in the first operating mode.

In step 146, it is determined that the target application is to run in the second operating mode.

The predefined security template may be understood as valid password information which is predefined, such as the fingerprint information, the graphic information or the character information. In the present embodiment, it is determined whether the target application is to run in the first operating mode or the target application is to run in the second operating mode by determining whether the security parameter information generated in the input operation matches with the valid password information.

For example, in a voice recorder application, the input operation performed by the user is acquired after the user clicks an icon of the voice recorder application by the operating body. The security parameter information such as the fingerprint information generated from the input operation is acquired. Then, it is determined whether the fingerprint information matches with a predefined fingerprint password. In a case that the fingerprint information matches with the predefined fingerprint password, it is determined that the voice recorder application is to run in the first operating mode. In this case, audio data has the security label, where the input operation triggers the voice recorder application to control a microphone to acquire the audio data. The audio data with the security label is in the accessible state only in a case that the first access authority is met. For example, in a case that the security parameter information of the user logging in to the electronic device conforms to the fingerprint texture information generated from the input operation, the user logging in to the electronic device can access the audio data. In a case that the security parameter information of the user logging in to the electronic device does not conform to the fingerprint texture information generated from the input operation, the user logging in to the electronic device can not access the audio data. In a case that the fingerprint information does not match with the predefined fingerprint password, it is determined that the voice recorder application is to run in the second operating mode. In this case, the audio data does not have the security label, where the input operation triggers the voice recorder application to control a microphone to acquire the audio data. The audio data without the security label is in the accessible state in a case that the second access authority is met. For example, regardless of whether the security parameter information of the user logging in to the electronic device conforms to the fingerprint texture information generated from the input operation, the user logging in to the electronic device can access the audio data.

Figure 6:
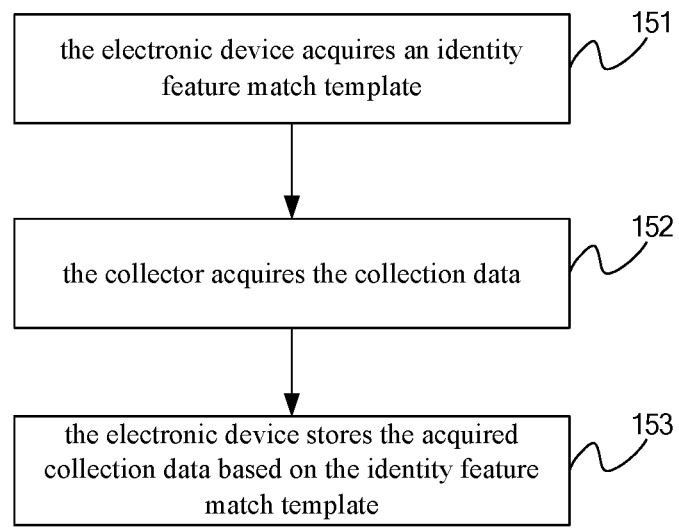
FIG. 6 is a partial flow chart of a control method for an electronic device according to another embodiment of the disclosure.

FIG. 6 is a partial flow chart of a control method for an electronic device according to another embodiment of the disclosure. As shown in FIG. 6, in step 104, in the case that the target application runs in the first operating mode, the control method further includes step 151 to step 153.

In step 151, the electronic device acquires an identity feature match template.

In step 152, the collector acquires the collection data.

In step 153, the electronic device stores the acquired collection data based on the identity feature match template.

The first operating mode may be a privacy operating mode. It should be noted that, in step 104, a performing order of the step of the electronic device acquiring the identity feature match template and the step of the collector acquiring the collection data are not limited. In practice, when a data acquiring application runs in the privacy operating mode, the electronic device may firstly acquire the identity feature match template, and then the collector acquire the collection data. Alternatively, the collector may firstly acquire the collection data, and then the electronic device records the identity feature match template. Finally, the acquired collection data is stored based on the identity feature match template.

In the present embodiment, in a case that the data acquiring application runs in the privacy operating mode, the electronic device acquires the identity feature match template in a recording phase and acquires the collection data in an acquiring phase, and then the electronic device enters a storing phase. In the storing phase, the electronic device stores the acquired collection data based on the identity feature match template. In this way, an access authority for the collection data is set based on the identity feature match template, and privacy of the user is protected.

In an embodiment, after the electronic device sets the access authority for the collection data based on the identity feature match template, the control method further includes: acquiring a user identity verification parameter when the collection data stored in the privacy operating mode is accessed; and opening an access authority for the collection data stored in the storing phase in a case that the user identity verification parameter matches with the identity feature match template. That is, when the user wants to access the collection data set with the access authority, the electronic device prompts the user to input the user identity verification parameter by displaying a prompt message. For example, the electronic device displays the prompt message to prompt the user to input the fingerprint information. The electronic device acquires the fingerprint information from the input operation of the user, and then the electronic device determines whether the fingerprint information inputted by the user matches with the identity feature match template. Thus, the electronic device determines whether to open the access authority for the collection data based on the determining result of the matching. Specifically, in the case that the fingerprint information inputted by the user matches with the identity feature match template, the access authority for the collection data is opened, and the user can access the collection data. In the case that the fingerprint information inputted by the user does not match with the identity feature match template, the access authority for the collection data is kept to be closed. Alternatively, the electronic device prompts to the user that the input of the user is wrong, and the user continues to input the fingerprint information until the fingerprint information inputted by the user matches with the identity feature match template, and then the access authority for the collection data is opened.

In another embodiment of the present disclosure, the second operating mode may be a common operating mode. Specifically, when the data acquiring application runs in the common operating mode, the collector of the electronic device acquires the collection data and stores the acquired collection data in the electronic device. That is, in the common operating mode, the electronic device directly stores the collection data acquired by the collector, and dose not set the access authority for the collection data. The running process of the data acquiring application in the common operating mode is the same as that of the data acquiring application in the conventional art.

The embodiments of the present disclosure are described in detail through the specific application scenarios as follows.

A camera is started up based on a user operation; a first prompt message is displayed to prompt the user to input first fingerprint information; the first fingerprint information is set as a fingerprint template after the first fingerprint information is acquired; a second prompt message is displayed to inquire the user whether to start up a fingerprint camera mode, that is, whether the camera is operated in the privacy operating mode; the fingerprint camera mode of the camera is started up based on the user operation; in the case that the camera is operated in the fingerprint camera mode, a collection photo is acquired in a collection area of the camera; the fingerprint template is added to the acquired collection photo, and the collection photo added with the fingerprint template is stored, that is, the access authority for the collection photo is set based on the fingerprint template, and the collection photo set with the access authority is stored.

In a case that the electronic device does not start up the fingerprint camera mode based on the user operation, the camera is operated in a common camera mode. The common camera mode is the same as the camera mode in the conventional art, which is not described herein.

When the user accesses the collection photo set with the access authority, a third prompt message is displayed to prompt the user to input verification fingerprint information, and the electronic device is triggered to enter a fingerprint verification phase. Specifically, the verification fingerprint information inputted by the user is acquired, and it is determined whether the verification fingerprint information matches with the fingerprint template. In the case that the verification fingerprint information matches with the fingerprint template, the access authority for the collection photo is opened. In the case that the verification fingerprint information does not match with the fingerprint template, the access authority for the collection photo is kept to be closed.

In the control method for the electronic device according to the embodiment of the disclosure, in the case that the data acquiring application of the electronic device runs in the privacy operating mode, the electronic device acquires the identity feature match template and the collection data, and then stores the acquired collection data based on the identity feature match template. In this way, the access authority for the collection data is set based on the identity feature match template, and an access authority corresponding to the collection data is set. Therefore, the privacy of the user is protected, and the user experience is enriched and improved.

Based on the control method for the electronic device according to the above embodiment of the disclosure, in the present embodiment, in step 104, the acquiring, by the electronic device, an identity feature match template includes:

acquiring, by a biological feature collector of the electronic device, a target identity feature parameter; and setting the target identity feature parameter as the identity feature match template.

In a specific embodiment, the biological feature collector may be a fingerprint collector. Furthermore, the biological feature collector i.e. the fingerprint collector has a collection area provided on a surface of a first key of the electronic device. Here, the first key is provided on a first surface of the electronic device. For example, the first key is provided on the first surface on which a display area of the electronic device is located. In particular, the first key may be the Home key. A touch display area is provided in the Home key. In this case, the collection area of the fingerprint collector may be provided on the touch display area of the Home key.

Furthermore, in a case that the data acquiring application runs in the privacy operating mode, in the recording phase of the electronic device, the target identity feature parameter, which is acquired at the collection area of the biological feature collector on the surface of the first key when the first key is triggered, is set as the identity feature match template.

The electronic device is controlled to enter the storing phase in response to a storing instruction generated by triggering the first key.

In practice, after acquiring the target identity feature parameter and setting the target identity feature parameter as the identity feature match template, the electronic device enters the storing phase in response to the storing instruction generated when the first key is triggered. In the storing phase, the collection data acquired in the acquiring phase is stored based on the identity feature match template. That is, in a case that the data acquiring application runs in the privacy operating mode, after the first key complete the process of acquiring the identity feature match template, the electronic device generates the storing instruction for storing the collection data based on the identity feature match template, to trigger the electronic device to enter the storing phase corresponding to the storing instruction, in response to the storing instruction.

In another specific embodiment, the collector has a collection key provided on the first key. For example, in a case that the first key is Home key, the first key can implement not only a function of acquiring the target identity feature parameter but also a function of acquiring the data such as photos, videos, audios. Correspondingly, in a case that the first key implements the function of acquiring the data, the control method further includes:

in the case that the data acquiring application runs in the privacy operating mode, in the acquiring phase of the electronic device, acquiring the collection data at the collection area of the collector when the first key is triggered.

Furthermore, the controlling the electronic device to enter the storing phase in response to a storing instruction generated by triggering the first key includes: controlling the electronic device to enter the storing phase in response to a storing instruction generated by triggering the first key in the recording phase or in response to a storing instruction generated by triggering the first key in the acquiring phase.

That is, the storing instruction for triggering the electronic device to enter the storing phase may be generated by triggering the first key in the recording phase of the electronic device. For example, in the case that the electronic device is in the recording phase, the target identity feature parameter is acquired using the biological feature collector of the electronic device, the target identity feature parameter is set as the identity feature match template. The storing instruction is generated, and the electronic device is triggered to store the collection data in respond to the storing instruction. Alternatively, the storing instruction for triggering the electronic device to enter the storing phase may also be generated by triggering the first key in the acquiring phase of the electronic device. For example, in the case that the electronic device is in the acquiring phase, the collection data is acquired at the collection area of the collector by triggering the first key. The storing instruction is generated, and the electronic device is triggered to store the collection data in respond to the storing instruction.

In the control method according to the embodiment of the disclosure, the first key is integrated with the biological feature collector, and the first key can implement a function of acquiring the target identity feature parameter. The first key can also implement a function of acquiring the data. Therefore, in the electronic device according to the embodiment of the disclosure, the function of acquiring the target identity feature parameter such as the fingerprint information and the function of acquiring the data may be implemented by the same key, thereby solving the problem in the conventional art that the function of acquiring the target identity feature parameter and the function of acquiring the data are implemented separately, and the user operations is simplified.

Furthermore, in the control method according to the embodiment of the disclosure, the access authority for the collection data may be set based on the identity feature match template, and the user operations are integrated in the same key. Therefore, according to the embodiment of the disclosure, the privacy of the user is protected, the problem of separating user operations is solved, and the user experience is improved.

Figure 7:
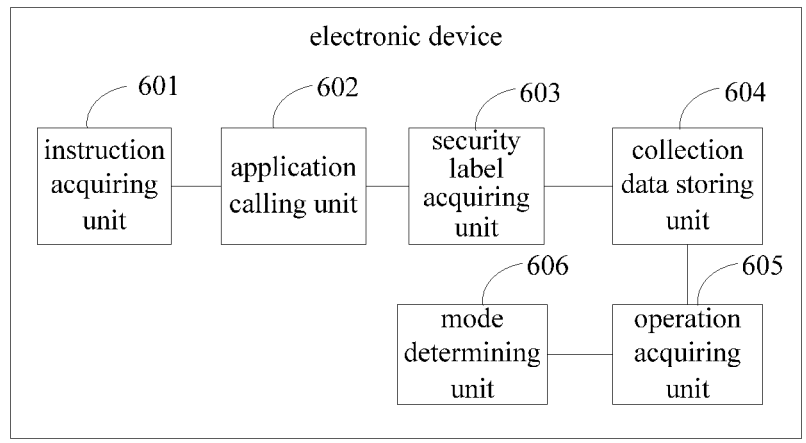
FIG. 7 is a schematic structural diagram of an electronic device according to an embodiment of the disclosure.

Reference is made to FIG. 7, a schematic structural diagram of an electronic device is shown according to an embodiment of the disclosure. The electronic device is a terminal device such as a mobile phone, a pad, a notebook, and an all-in-one machine. The electronic device includes a collector for acquiring data, such as a touch screen, a camera or a microphone.

In the present embodiment, the electronic device may include an instruction acquiring unit 601, an application calling unit 602, a security label acquiring unit 603 and a collection data storing unit 604.

The instruction acquiring unit 601 is configured to acquire a call instruction.

The call instruction may be an instruction that a user selects an icon of a target application on a display screen of the electronic device to cause the target application to enter a running state.

The application calling unit 602 is configured to call a target application in response to the call instruction.

The target application is used to control a collector of the electronic device to acquire and store collection data. The collection data may be character data acquired by the touch screen, such as a log; multimedia data acquired by the camera, such as a photo or a video; or audio data acquired by the microphone, such as a sound recording. The target application may be an application capable of control the collector to acquire and store the collection data, such as a notebook application, a camera application, a voice recorder application. In the present embodiment, the target application corresponding to the call instruction is called after the call instruction is acquired, to control the collector of the electronic device to acquire and store the collection data.

The security label acquiring unit 603 is configured to acquire a security label, in a case that the target application operates in a first operating mode.

The collection data storing unit 604 is configured to store the acquired collection data based on the security label, as a collection data with the security label.

The collection data with the security label is in an accessible state when a first access authority is met.

With the electronic device according to the embodiment of the disclosure, the target application is called in response to the call instruction, to acquire collection data. The security label is acquired, in the case that the target application operates in a first operating mode. The acquired collection data is stored based on the security label, as a collection data with the security label. The collection data with the security label is in an accessible state when a first access authority is met. Thus, in the embodiment, the security label may be added for the collection data, so as to provide a safety protection for the collection data.

In another embodiment, the electronic device further includes an operation acquiring unit 605 and a mode determining unit 606.

The operation acquiring unit 605 is configured to acquire an input operation in a process of the target application in a running state.

In a process from starting the target application to keeping the target application in the running state, the user performs the input operation on the electronic device. In the embodiment, the input operation is acquired at this time. The input operation can indicate that the user wants to protect the collection data currently acquired by the collector. For example, the user wants to perform privacy setting on the collection data acquired by the collector, or the user does not want to protect the security of the collection data so that the collection data may be accessed (such as, viewed or edited) by other users. In the present embodiment, the user performs the input operation on the electronic device depending on the requirement.

The mode determining unit 606 is configured to determine whether the target application is to run in a first operating mode or in a second operating mode based on the input operation.

In the present embodiment, what security setting the user want to perform on the collection data may be determined by analyzing parameter information generated from the input operation. That is, it is determined whether the target application is to run in the first operating mode or in the second operating mode. Then, the target application is controlled to run in the first operating mode or in the second operating mode based on the determining result.

Specifically, in a case that the target application runs in the first operating mode, the collection data acquired by the collector of the electronic device has a security label. The collection data with the security label is in an accessible state in a case that a first access authority is met. The first access authority is a specific access authority, such as an access authority of the user or an operating body meeting a certain requirement. In the case of an access authority other than the first access authority, the collection data with the security label is in an inaccessible state, in which for example the collection data is hidden, or the collection data can not be viewed or edited.

For example, the target application may be a camera application. In a case that the camera application runs in the first operating mode, photo or video data acquired by a camera under the control of the camera application has the security label. The data with the security label can be accessed, such as displayed or edited, only in a case that the first access authority is met. The data with the security label can not be accessed, such as displayed or edited, in the case that an access authority other than the first access authority is met.

In another embodiment, the collection data storing unit 604 is further configured to store the acquired collection data, as a collection data without the security label.

The collection data without the security label may be in the accessible state when a second access authority is met.

Particularly, in a case that the target application runs in the second operating mode, the collection data acquired by the collector of the electronic device does not have the security label. The collection data without the security label is in the accessible state in a case that a second access authority is met. The second access authority with respect to the first access authority may be understood as an access authority in which the collection data may be accessed by any users or any operation bodies.

For example, the target application may be a notebook application. In a case that the notebook application runs in the second operating mode, character data acquired by a touch screen under the control of the notebook application does not have the security label. The data without the security label can be accessed, such as displayed or edited, in a case that the second access authority is met.

With the control method for the electronic device according to the disclosure, the operating mode of the target application in the electronic device is determined based on the input operation of the user acquired in the running state of the target application. In the case that the target application runs in the first operating mode, the collection data acquired by the collector of the electronic device has the security label. In the case that the target application runs in the second operating mode, the collection data acquired by the collector of the electronic device does not have the security label. The collection data is in the accessible state in a case that a corresponding access authority is met. In this way, it is determined whether to protect the security of the collection data acquired by the collector based on the input operation, thereby avoiding the case that the user can not use the terminal when the user forgets the security password. Therefore, according to the present embodiment, the user can call the application in the terminal to acquire the collection data in a case that the input operation does not include the security label, and the security of the collection data may be protected in a case that the input operation includes the security label, thereby bringing the user more usage effect and improving the user experience.

It should be noted that, in the above embodiment, the input operation may include: the target application controlling the collector of the electronic device to acquire the collection data in a case that the target application is in the running state.

That is, the input operation is an operation performed on the electronic device by the user in the running state of the target application. The input operation is a triggering operation for triggering the target application to control the collector to acquire the collection data in the running state of the target application.

For example, the user calls a voice recorder application in the electronic device, and the user performs an input operation on the electronic device in a process from starting the voice recorder application to keeping the voice recorder application in the running state. In the present embodiment, the input operation is acquired at this time. The input operation triggers the voice recorder application to control a microphone to record a voice in a case that the voice recorder application is in the running state.

Figure 8:
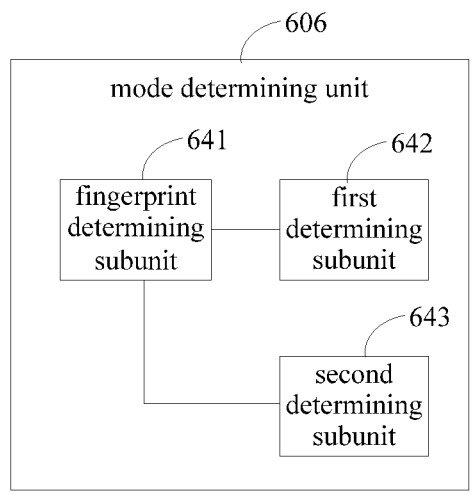
FIG. 8 is a partial schematic structural diagram of an electronic device according to another embodiment of the disclosure.

Referring to FIG. 8, a partial schematic structural diagram of an electronic device is shown according to another embodiment of the disclosure. As shown in FIG. 8, the mode determining unit 606 may include a fingerprint determining subunit 641, a first determining subunit 642 and a second determining subunit 643.

The fingerprint determining subunit 641 is configured to: determine whether the acquired input operation includes a fingerprint texture parameter; trigger the first determining subunit 642 in a case that the acquired input operation includes the fingerprint texture parameter; and trigger the second determining subunit 643 in a case that the acquired input operation does not include the fingerprint texture parameter.

The first determining subunit 642 is configured to determine that the target application is to run in the first operating mode.

In the case that the target application runs in the first operating mode, the security label of the collection data acquired by the collector of the electronic device is the fingerprint texture parameter.

The second determining subunit 643 is configured to determine that the target application is to run in the second operating mode.

In the present embodiment, in the running state of the target application, it is determined whether the input operation for triggering the target application to control the collector to acquire the collection data includes the fingerprint texture parameter, so as to determine whether the target application is to run in the first operating mode or in the second operating mode. Then it is determined whether to set the security label to the collection data acquired by the collector.

Correspondingly, in a case that the target application runs in the first operating mode, the collection data acquired by the collector of the electronic device has the fingerprint texture parameter as the security label. The collection data with the fingerprint texture parameter as the security label is in the accessible state in a case that the first access authority is met. In a case that the target application runs in the second operating mode, the collection data acquired by the collector of the electronic device does not have the fingerprint texture parameter. The collection data without the fingerprint texture parameter is in the accessible state in a case that the second access authority is met.

Figure 9:
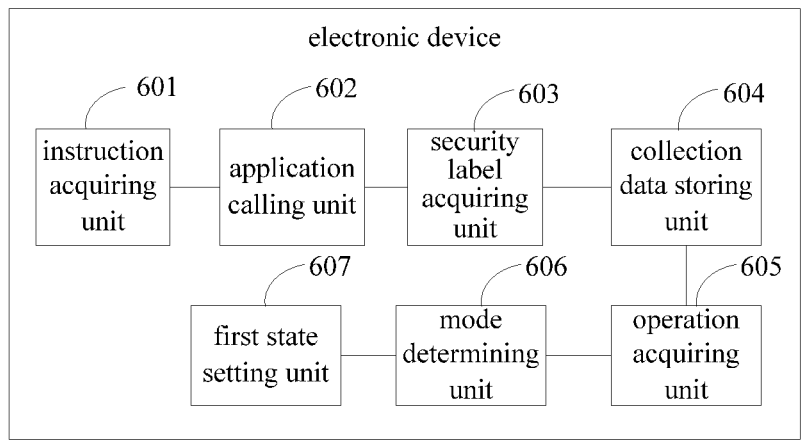
FIG. 9 is a schematic structural diagram of an electronic device according to another embodiment of the disclosure.

Based on the above embodiment, an access state of the collection data may be set based on the fingerprint texture parameter after the collection data is stored. Referring to FIG. 9, a schematic structural diagram of an electronic device is shown according to another embodiment of the disclosure. The electronic device may further include a first state setting unit 607.

The first state setting unit 607 is configured to: determine whether security parameter information of a user logging in to the electronic device conforms to the fingerprint texture parameter; set both the collection data with the fingerprint texture parameter and the collection data without the fingerprint texture parameter to the accessible state in a case that the security parameter information of the user logging in to the electronic device conforms to the fingerprint texture parameter; and set the collection data with the fingerprint texture parameter to an inaccessible state for hiding the collection data and set the collection data without the fingerprint texture parameter to the accessible state in a case that the security parameter information of the user logging in to the electronic device does not conform to the fingerprint texture parameter.

The security parameter information of the user logging in to the electronic device may be understood as information capable of indicating an identity of the user logging in to the electronic device. Thus, when the security parameter information conforms to the fingerprint texture parameter, it is indicated that the security of the identity of the user currently logging in to the electronic device conforms to a preset rule. For example, the user currently logging in to the electronic device is a valid user for the collection data corresponding to the fingerprint texture parameter. Thus, all of the collection data, such as both the collection data with the fingerprint texture parameter and the collection data without the fingerprint texture parameter, are set to the accessible state. The user currently logging in to the electronic device can access all of the collection data, that is, it is in the case of the first access authority.

When the security parameter information does not conform to the fingerprint texture parameter, it is indicated that the security of the identity of the user currently logging in to the electronic device does not conform to the preset rule. For example, the user currently logging in to the electronic device is an invalid user for the collection data corresponding to the fingerprint texture parameter. Not all of the collection data can be accessed by the invalid user. The invalid user can not access the collection data corresponding to the fingerprint texture parameter. In the present embodiment, only the collection data without the fingerprint texture parameter is set to the accessible state, the collection data with the fingerprint texture parameter is set to the inaccessible state for hiding the collection data. That is, in a case that the identity of the user currently logging in to the electronic device is not a safe identity, the collection data with the fingerprint texture parameter is hidden, which thus is in the inaccessible state and can not be viewed. In this way, the security of the collection data is protected.

The camera application is taken as an example. The input operation of the user is acquired in a process from starting the camera application to keeping the camera application in the running state. It is determined whether the camera application is to run in the first operating mode such as a safe mode, or the camera application is to run in the second operating mode such as a common mode, by determining whether the acquired input operation includes the fingerprint texture parameter. The input operation triggers the camera application to control the collector such as the camera to acquire and store the photo data, after it is determined that the camera application is in the operating mode. Specifically, if the camera application runs in the safe mode, the photo data has the security label and the fingerprint texture parameter may be set as the security label. If the camera application runs in the common mode, the photo data does not have the security label. It is determined whether the security parameter information of the user logging in to the electronic device conforms to the fingerprint texture parameter when the collection data corresponding to the camera application is accessed such as viewed or edited by the user. Then, the access state of the photo data is set based on the determining result. Specifically, in the case that the security parameter information of the user logging in to the electronic device conforms to the fingerprint texture parameter, all of the photo data is set to the accessible state in which all of the photo data can be viewed or edited. In the case that the security parameter information does not conform to the fingerprint texture parameter, the photo data with the fingerprint texture parameter is set to the inaccessible state for hiding the photo data, and the photo data without the fingerprint texture parameter is set to the accessible state. In this way, the user, the security parameter information of whom conforming to the fingerprint texture parameter, can access only the photo data without the fingerprint texture parameter, and can not access the photo data with the fingerprint texture parameter.

Thus, in the technical solution according to the present embodiment, multiple users can use the same application in the same electronic device and protect the security of their own collection data such as photos.

Figure 10:
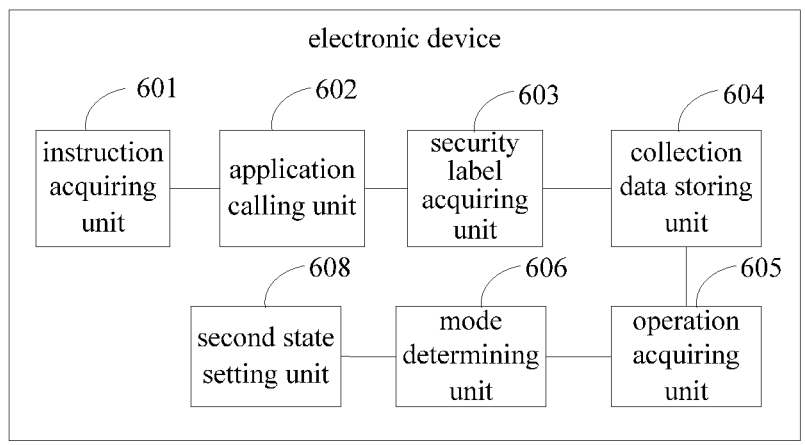
FIG. 10 is a schematic structural diagram of an electronic device according to another embodiment of the disclosure.

In another embodiment, referring to FIG. 10, a schematic structural diagram of an electronic device is shown according to another embodiment of the disclosure. The electronic device may further include a second state setting unit 608.

The second state setting unit 608 is configured to: determine whether security parameter information of an operating body currently operating and browsing the application conforms to the fingerprint texture parameter; set both the collection data with the fingerprint texture parameter and the collection data without the fingerprint texture parameter to the accessible state in a case that the security parameter information of the operating body currently operating and browsing the application conforms to the fingerprint texture parameter; or set the collection data with the fingerprint texture parameter to an inaccessible state for hiding the collection data and set the collection data without the fingerprint texture parameter to the accessible state in a case that the security parameter information of the operating body currently operating and browsing the application does not conform to the fingerprint texture parameter.

The security parameter information of the operating body currently operating and browsing the application may be understood as information capable of indicating an identity of the user operating the operating body which currently operates and views the application. In a case that the security parameter information conforms to the fingerprint texture parameter, it is indicated that the security of the identity of the user operating the operating body, which currently operates and views the application, conforms to a preset rule. All of the collection data, such as the collection data with the fingerprint texture parameter and the collection data without the fingerprint texture parameter, are set to the accessible state. The user operating the operating body, which currently operates and views the application, can access all of the collection data, that is, it is in the case of the first access authority.

In a case that the security parameter information does not conform to the fingerprint texture parameter, it is indicated that the security of the identity of the user, who operates the operating body currently operating and browsing the application, does not conform to the preset rule. Not all of the collection data can be accessed by the user. In the present embodiment, only the collection data without the fingerprint texture parameter is set to the accessible state, the collection data with the fingerprint texture parameter is set to the inaccessible state for hiding the collection data. That is, in a case that the identity of the user, who operates the operating body currently operating and browsing the application, is not a safe identity, the collection data with the fingerprint texture parameter is hidden to be in the inaccessible state, and a can not be viewed. In this way, the security of the collection data is protected.

The log application or notebook application is taken as an example. The input operation performed by the user in a process from starting the log application to keeping the log application in the running state. It is determined whether the log application is to run in the first operating mode such as a safe mode, or the log application is to run in the second operating mode such as a common mode, by determining whether the acquired input operation includes the fingerprint texture parameter. The input operation triggers the log application to control the collector such as the touch screen to acquire and store the character data after the operating mode of the log application is determined. Specifically, in a case that the log application runs in the safe mode, the character data has the security label, and the fingerprint texture parameter may be set as the security label. In a case that the log application runs in the common mode, the character data does not have the security label. It is determined whether the security parameter information of the operating body currently operating and browsing the log application conforms to the fingerprint texture parameter, when the operating body operates and scans the log application to view or edit the log. Then, the access state of the character data i.e. the log is set based on the determining result. Specifically, in a case that the security parameter information of the operating body currently operating and browsing the application conforms to the fingerprint texture parameter, all of the character data is set to the accessible state in which the character data can be viewed or edited. In a case that the security parameter information does not conform to the fingerprint texture parameter, the character data with the fingerprint texture parameter is set to the inaccessible state for hiding the character data, and the character data without the fingerprint texture parameter is set to the accessible state. In this way, the user, who operates the security parameter information of be not conforming to the fingerprint texture parameter, can access only the character data without the fingerprint texture parameter, and can not access the character data with the fingerprint texture parameter.

Thus, in the technical solution according to the present embodiment, multiple users can use the same application in the same electronic device and protect the security of their own collection data such as logs.

Figure 11:
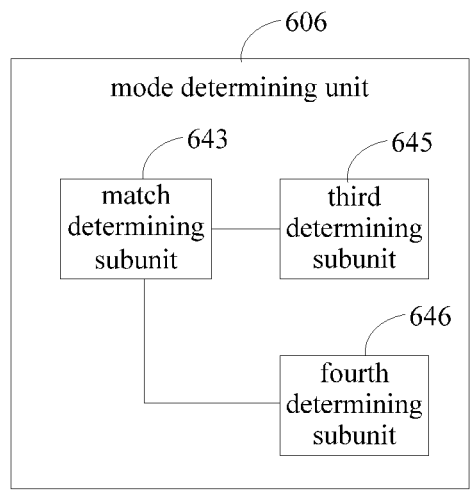
FIG. 11 is a partial schematic structural diagram of an electronic device according to another embodiment of the disclosure.

In other embodiments of the present disclosure, the security parameter information such as fingerprint information, graphic information or character information may be generated from the input operation. Referring to FIG. 11, a schematic structural diagram of the mode determining unit 606 is shown according to another embodiment of the disclosure. The mode determining unit 606 may include a match determining subunit 644, a third determining subunit 645 and a fourth determining subunit 646.

The match determining subunit 644 is configured to: determine whether the security parameter information generated from the input operation matches with a predefined security template; trigger a third determining subunit in a case that the security parameter information matches with the predefined security template; and trigger a fourth determining subunit in a case that the security parameter information does not match with the predefined security template.

The third determining subunit 645 is configured to determine that the target application is to run in the first operating mode.

The fourth determining subunit 646 is configured to determine that the target application is to run in the second operating mode.

The predefined security template may be understood as valid password information which is predefined, such as the fingerprint information, the graphic information or the character information. In the present embodiment, it is determined whether the target application is to run in the first operating mode or the target application is to run in the second operating mode by determining whether the security parameter information generated in the input operation matches with the valid password information.

For example, in a voice recorder application, the input operation performed by the user is acquired after the user clicks an icon of the voice recorder application by the operating body. The security parameter information such as the fingerprint information generated from the input operation is acquired. Then, it is determined whether the fingerprint information matches with a predefined fingerprint password. In a case that the fingerprint information matches with the predefined fingerprint password, it is determined that the voice recorder application is to run in the first operating mode. In this case, audio data has the security label where the input operation triggers the voice recorder application to control a microphone to acquire the audio data. The audio data with the security label is in the accessible state only in a case that the first access authority is met. For example, in a case that the security parameter information of the user logging in to the electronic device conforms to the fingerprint texture information generated from the input operation, the user logging in to the electronic device can access the audio data. In a case that the security parameter information of the user logging in to the electronic device does not conform to the fingerprint texture information generated from the input operation, the user logging in to the electronic device can not access the audio data. In a case that the fingerprint information does not match with the predefined fingerprint password, it is determined that the voice recorder application is to run in the second operating mode. In this case, the audio data does not have the security label, where the input operation triggers the voice recorder application to control a microphone to acquire the audio data. The audio data without the security label is in the accessible state in a case that the second access authority is met. For example, regardless of whether the security parameter information of the user logging in to the electronic device conforms to the fingerprint texture information generated from the input operation, the user logging in to the electronic device can access the audio data.

Figure 12:
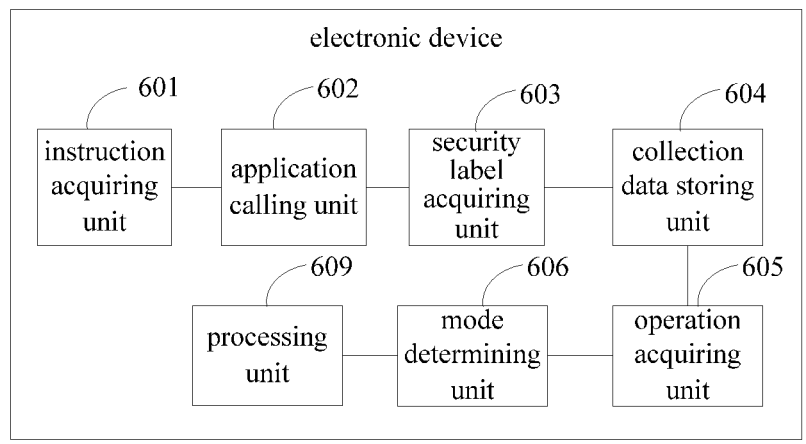
FIG. 12 is a schematic structural diagram of an electronic device according to another embodiment of the disclosure.

In another embodiment, the security label may be an identity feature match template. Referring to FIG. 12, a schematic structural diagram of an electronic device is shown according to another embodiment of the disclosure. The electronic device may further include a processing unit 609.

The processing unit 609 is configured to, in a case that the target application runs in the first operating mode, acquire the identity feature match template; trigger the collector to acquire the collection data; and store the acquired collection data based on the identity feature match template.

It should be understood by those skilled in the art that function of each processing unit of the electronic device according to the embodiments of the disclosure can be understood with reference to the above related description for the control method. Each processing unit of the electronic device according to the embodiments of the disclosure may be implemented by an analog circuit implementing the functions described in the embodiments of the disclosure, and may also be implemented by executing software implementing the functions described in the embodiments of the disclosure on an intelligent terminal.

Figure 13:
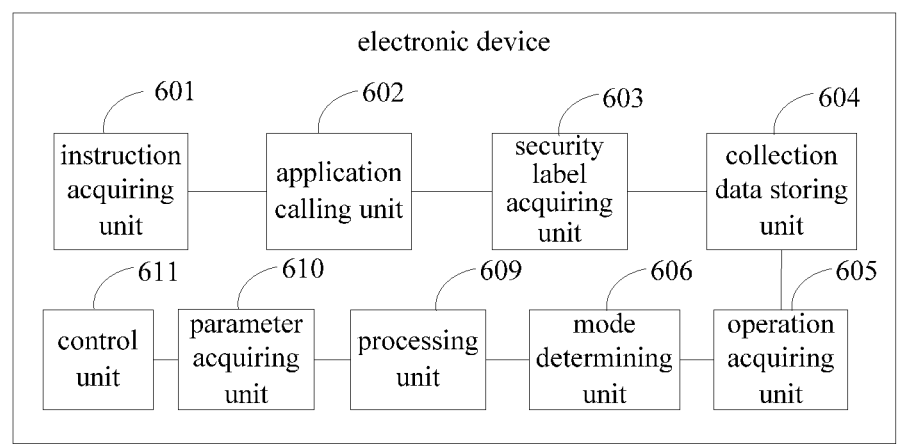
FIG. 13 is a schematic structural diagram of an electronic device according to another embodiment of the disclosure.

FIG. 13 is a schematic structural diagram of an electronic device according to another embodiment of the disclosure. As shown in FIG. 12, the electronic device may further include a parameter acquiring unit 610 and a control unit 611.

The parameter acquiring unit 610 is configured to acquire a user identity verification parameter when the collection data stored in the first operating mode is accessed.

The control unit 611 is configured to open an access authority for the collection data stored in a storing phase in a case that the user identity verification parameter matches with the identity feature match template.

The processing unit 609 is further configured to: acquire a target identity feature parameter by a biological feature collector of the electronic device; and set the target identity feature parameter as the identity feature match template.

In an embodiment, the biological feature collector has a collection area provided on a surface of a first key of the electronic device.

The processing unit 609 is further configured to: set the target identity feature parameter, which is acquired at the collection area of the biological feature collector on the surface of the first key when the first key is triggered, as the identity feature match template; and store the acquired collection data based on the identity feature match template in response to a storing instruction generated by triggering the first key.

In an embodiment, the collector has a collection key provided on the first key.

The processing unit 609 is further configured to acquire the collection data at a collection area of the collector when the first key is triggered, in the case that a data acquiring application runs in a privacy operating mode.

In an embodiment, the processing unit 609 is further configured to control the electronic device to enter the storing phase in response to a storing instruction generated by triggering the first key in the recording phase or in response to a storing instruction generated by triggering the first key in the acquiring phase.

It should be understood by those skilled in the art that function of each processing unit of the electronic device according to the embodiments of the disclosure can be understood with reference to the above related description for the control method. Each processing unit of the electronic device according to the embodiments of the disclosure may be implemented by an analog circuit implementing the functions described in the embodiments of the disclosure, and may also be implemented by executing software implementing the functions described in the embodiments of the disclosure on an intelligent terminal.

It should be understood by those skilled in the art that all or a part of the steps for implementing the above method embodiments may be performed by related hardware instructed by a program. The program may be stored in a computer readable storage medium and when being executed may perform steps included in the above method embodiments. The storage medium includes various mediums which may store a program code, such as a mobile storage device, a Read-Only Memory (ROM), a Random Access Memory (RAM), a magnetic disc or a compact disc.

If the integrated unit in the disclosure is implemented in the form of software functional module and is sold or used as a separate product, it can be stored in a computer readable storage medium. Based on such understanding, the technical scheme of the embodiment of the disclosure essentially or its part that provides contribution to the existing technology may be expressed in the form of a software product. The computer software product is stored in one storage medium, and includes several instructions which enable a computer device (which may be a personal computer, a server, or a network device, etc.) to execute all or part of the method of each embodiment of the disclosure. The storage medium described above includes: a mobile storage device, a Read-Only Memory (ROM), a Random Access Memory (RAM), a magnetic disc or a compact disc and all kinds of mediums which can store program codes, and etc.

It should be noted that the embodiments of the present disclosure are described herein in a progressive manner, with an emphasis placed on explaining the difference between each embodiment and the other embodiments; hence, for the same or similar parts among the embodiments, they can be referred to from one another.

It should be noted that the relationship terminologies such as first and second are only used herein to distinguish an entity or operation from another entity or operation, and it is not necessarily required or implied that there are any actual relationship or order of this kind between those entities and operations. Moreover, the terminologies of 'include', 'including' and any other variants are intended to cover non-exclusive contains, so that the processes, methods, articles or devices including a series of elements not only include those elements but also include other elements that are not listed definitely or also include the elements inherent in the processes, methods, articles or devices. In the case of no more restrictions, the elements defined by the statement 'include one . . . ' do not exclude that other same elements also exist in the processes, methods, articles or devices including the elements.

The electronic device and the control method for the electronic device according to the application are described as above. The principles and the embodiments of the application are described herein by using specific embodiment. However, the description of the above-mentioned embodiments is only for helping to understand the method and the core concept of the application. Moreover, for the skilled in the art, modifications may be made to the embodiments and the applications in the light of the concept of the application. As a result, the content in this application should not be understood as limiting the present application.

The invention claimed is:

1. A control method for an electronic device, comprising:
acquiring, by the electronic device, a call instruction;
calling, by the electronic device, a target application in response to the call instruction, to control a collector of the electronic device to acquire collection data;
acquiring, by the electronic device, a security label, in a case that the target application operates in a first operating mode;
storing, by the electronic device, the acquired collection data based on the security label, as first stored collection data, wherein the first stored collection data is in an accessible state when a first access authority is met;
acquiring, by the electronic device, security parameter information of a user in response to the user logging in to the electronic device, or security parameter information of an operating body in response to the operating body currently operating and browsing the target application;
determining, by the electronic device, whether security parameter information of the user or the operating body conforms to the security label; and
setting, by the electronic device, the first stored collection data to the accessible state, in a case that the security parameter information of the user or the operating body conforms to the security label,
wherein before the acquiring, by the electronic device, a security label, in a case that the target application operates in a first operating mode:

acquiring, by the electronic device, an input operation in a running state of the target application, and determining, by the electronic device, whether the target application is to run in the first operating mode or in a second operating mode based on the input operation, wherein the determining, by the electronic device, whether the target application is to run in the first operating mode or in the second operating mode based on the input operation comprises:

determining, by the electronic device, whether the input operation comprises a fingerprint texture parameter, determining, by the electronic device, that the target application is to run in the first operating mode in a case that the input operation comprises the fingerprint texture parameter, and determining, by the electronic device, that the target application is to run in the second operating mode in a case that the input operation does not comprise the fingerprint texture parameter, and wherein in the case that the target application runs in the first operating mode, the security label of the collection data acquired by the collector of the electronic device is the fingerprint texture parameter.

2. The control method according to claim 1, wherein in a case that the target application runs in the second operating mode, the control method further comprises:

storing, by the electronic device, the acquired collection data, as second stored collection data;

wherein the second stored collection data is in the accessible state when a second access authority is met; and setting, by the electronic device, the second stored collection data to the accessible state.

3. The control method according to claim 1, wherein the input operation comprises: the target application controlling the collector of the electronic device to acquire the collection data, in the running state of the target application.

4. The control method according to claim 1, further comprising:

setting the first stored collection data to an inaccessible state for hiding the collection data, in a case that the security parameter information of the user or the operating body does not conform to the fingerprint texture parameter.

5. The control method according to claim 1, wherein:

security parameter information is generated from the input operation, and the determining, by the electronic device, whether the target application is to run in the first operating mode or in the second operating mode based on the input operation comprises:

determining, by the electronic device, whether the security parameter information generated from the input operation matches with a predefined security template;

determining, by the electronic device, that the target application is to run in the first operating mode, in a case that the security parameter information matches with the predefined security template; and determining, by the electronic device, that the target application is to run in the second operating mode, in a case that the security parameter information does not match with the predefined security template.

6. The control method according to claim 1, wherein the security label is an identity feature match template, and in the case that the target application runs in the first operating mode, the control method further comprises:

acquiring, by the electronic device, the identity feature match template;

acquiring, by the collector, the collection data; and storing, by the electronic device, the acquired collection data based on the identity feature match template.

7. The control method according to claim 6, further comprising:

acquiring, by the electronic device, a user identity verification parameter when the first stored collection data stored in the first operating mode is accessed; and opening, by the electronic device, an access authority for the first stored collection data stored in the first operating mode in a case that the user identity verification parameter matches with the identity feature match template.

8. The control method according to claim 6, wherein the acquiring, by the electronic device, the identity feature match template comprises:

acquiring, by the electronic device, a target identity feature parameter using a biological feature collector; and setting, by the electronic device, the target identity feature parameter as the identity feature match template.

9. The control method according to claim 8, wherein the biological feature collector has a first collection area provided on a surface of a first key of the electronic device, and the acquiring, by the electronic device, the identity feature match template comprises:

recording, by the electronic device, the target identity feature parameter as the identity feature match template, wherein the target identity feature parameter is acquired at the first collection area of the biological feature collector provided on the surface of the first key when the first key is triggered; and the storing, by the electronic device, the acquired collection data based on the identity feature match template comprises:

storing, by the electronic device, the acquired collection data based on the identity feature match template, in response to a storing instruction generated by triggering the first key.

10. The control method according to claim 9, wherein the collector has a second collection area provided on the first key, and the acquiring, by the collector, the collection data comprises: acquiring the collection data at the second collection area of the collector when the first key is triggered.

11. An electronic device, comprising:

an instruction acquiring unit configured to acquire a call instruction;

an application calling unit configured to call a target application in response to the call instruction, to control a collector of the electronic device to acquire collection data;

a security label acquiring unit configured to acquire a security label, in a case that the target application operates in a first operating mode;

a collection data storing unit configured to store the acquired collection data based on the security label, as first stored collection data, wherein the first stored collection data is in an accessible state when a first access authority is met;

a state setting unit, configured to:

acquire security parameter information of a user in response to the user logging in to the electronic device, or security parameter information of an operating body in response to the operating body currently operating and browsing the target application;
determine whether the security parameter information of the user or the operating body conforms to the security label; and
set the first stored collection data to the accessible state, in a case that the security parameter information of the user or the operating body conforms to the security label;
an operation acquiring unit configured to acquire an input operation in a running state of the target application; and
a mode determining unit configured to determine whether the target application is to run in the first operating mode or in a second operating mode based on the input operation,
wherein the mode determining unit comprises:
a fingerprint determining subunit configured to:
determine whether the acquired input operation comprises a fingerprint texture parameter,
trigger a first determining subunit in a case that the input operation comprises the fingerprint texture parameter, and
trigger a second determining subunit in a case that the input operation does not comprise the fingerprint texture parameter,
the first determining subunit configured to determine that the target application is to run in the first operating mode, and
the second determining subunit configured to determine that the target application is to run in the second operating mode, and
wherein in the case that the target application runs in the first operating mode, the security label of the collection data acquired by the collector of the electronic device is the fingerprint texture parameter.

12. The electronic device according to claim 11, wherein:
the collection data storing unit is further configured to store the acquired collection data, as second stored collection data,
the second stored collection data is in the accessible state when a second access authority is met; and
the state setting unit is further configured to set the second stored collection data to the accessible state.

13. The electronic device according to claim 11, wherein the input operation comprises: the target application controlling the collector of the electronic device to acquire the collection data in the case that the target application is in the running state.

14. The electronic device according to claim 11, wherein the state setting unit is further configured to:
set the first stored collection data to an inaccessible state for hiding the collection data, in a case that the security parameter information of the user or the operating body current does not conform to the fingerprint texture parameter.

15. The electronic device according to claim 11, wherein security parameter information is generated from the input operation, and the mode determining unit comprises:

a match determining subunit configured to: determine whether the security parameter information generated from the input operation matches with a predefined security template; trigger a third determining subunit in a case that the security parameter information matches with the predefined security template; and trigger a fourth determining subunit in a case that the security parameter information does not match with the predefined security template;
the third determining subunit configured to determine that the target application is to run in the first operating mode; and
the fourth determining subunit configured to determine that the target application is to run in the second operating mode.

16. The electronic device according to claim 11, wherein the security label is an identity feature match template, and
the electronic device further comprises: a processing unit configured to, in the case that the target application runs in the first operating mode, acquire the identity feature match template; trigger the collector to acquire the collection data; and store the acquired collection data based on the identity feature match template.

17. The electronic device according to claim 16, further comprising:
a parameter acquiring unit configured to acquire a user identity verification parameter when the collection data stored in the first operating mode is accessed; and
a control unit configured to open an access authority for the collection data stored in the first operating mode, in a case that the user identity verification parameter matches with the identity feature match template.

18. The electronic device according to claim 16, wherein the processing unit is further configured to: acquire a target identity feature parameter by a biological feature collector of the electronic device; and set the target identity feature parameter as the identity feature match template.

19. The electronic device according to claim 18, wherein the biological feature collector has a first collection area provided on a surface of a first key of the electronic device, and
the processing unit is further configured to: record the target identity feature parameter as the identity feature match template, wherein the target identity feature parameter is acquired at the first collection area of the biological feature collector provided on the surface of the first key when the first key is triggered; and store the acquired collection data based on the identity feature match template in response to a storing instruction generated by triggering the first key.

20. The electronic device according to claim 19, wherein the collector has a second collection area provided on the first key, and the processing unit is further configured to acquire the collection data at the second collection area of the collector when the first key is triggered.

* * * * *